(12) United States Patent
Schmitz et al.

(10) Patent No.: US 9,882,475 B2
(45) Date of Patent: Jan. 30, 2018

(54) PWM CALCULATION AFTER LIGHT LOAD TO HIGH LOAD TRANSITION

(71) Applicant: IDT Europe GmbH, Dresden (DE)

(72) Inventors: Richard Maria Schmitz, San Tan Valley, AZ (US); Eric Marschalkowski, Inning am Ammersee (DE); Chris Young, Round Rock, TX (US)

(73) Assignee: IDT EUROPE GMBH, Dresden (DE)

( * ) Notice: Subject to any disclaimer, the term of this patent is extended or adjusted under 35 U.S.C. 154(b) by 0 days.

(21) Appl. No.: 14/890,835

(22) PCT Filed: May 23, 2014

(86) PCT No.: PCT/EP2014/060681
§ 371 (c)(1),
(2) Date: Nov. 12, 2015

(87) PCT Pub. No.: WO2014/187965
PCT Pub. Date: Nov. 27, 2014

(65) Prior Publication Data
US 2016/0118881 A1 Apr. 28, 2016

Related U.S. Application Data

(60) Provisional application No. 61/827,230, filed on May 24, 2013.

(51) Int. Cl.
*H02M 3/158* (2006.01)
*H02M 3/157* (2006.01)
(Continued)

(52) U.S. Cl.
CPC ........... *H02M 3/157* (2013.01); *H02M 3/156* (2013.01); *H02M 3/158* (2013.01); *H02M 1/32* (2013.01);
(Continued)

(58) Field of Classification Search
CPC ............ H02M 3/00; H02M 3/02; H02M 3/10; H02M 3/145; H02M 3/155; H02M 3/156;
(Continued)

(56) References Cited

U.S. PATENT DOCUMENTS 6,509,721 B1 1/2003 Liebler
7,834,606 B2 * 11/2010 Liu ....................... H02M 3/157
 323/283

(Continued)

FOREIGN PATENT DOCUMENTS

CN 1407419 A 4/2003
CN 1622437 A 6/2005
(Continued)

OTHER PUBLICATIONS

International Search Report for International Application No. PCT/EP2014/060681, dated Sep. 9, 2014.
(Continued)

*Primary Examiner* — Timothy J Dole
*Assistant Examiner* — Carlos Rivera-Perez
(74) *Attorney, Agent, or Firm* — Heslin Rothenberg Farley & Mesiti P.C.

(57) ABSTRACT

A switchable power converter includes a switchable power stage comprising an inductor and a capacitor for generating an output voltage according to a switching signal and an input voltage via a switching element comprising a high-side switch and a low-side switch driven by a driver according to the switching signal generated either in a digital control path or a constant-on-time control path. A multi-mode controller is configured to toggle between a light load mode in which the constant-on-time control path is activated and a high load mode in which the digital control path is activated. The multi-mode controller is further configured to generate a control signal for turning on the high-side switch for an
(Continued)

additional time when transitioning from the light load mode to the high load mode.

7 Claims, 3 Drawing Sheets

(51) Int. Cl.
    *H02M 3/156*     (2006.01)
    *H02M 1/32*     (2007.01)
    *H02M 1/00*     (2006.01)

(52) U.S. Cl.
    CPC .. *H02M 3/1588* (2013.01); *H02M 2001/0032* (2013.01); *Y02B 70/1466* (2013.01); *Y02B 70/16* (2013.01)

(58) Field of Classification Search
    CPC .... H02M 3/157; H02M 3/158; H02M 3/1588; H02M 3/1563; H02M 2001/0008; H02M 2001/0009; H02M 2001/0025; H02M 2001/0032; H02M 2001/0035; H02M 1/14; H02M 1/32; H02M 2003/1566; Y02B 70/1466; Y02B 70/16
    USPC ................ 323/222–226, 266, 271–277, 280, 323/282–288, 351; 363/21.04, 21.05, 363/21.12, 21.13, 41, 74, 123–127; 361/18
See application file for complete search history.

(56) References Cited

U.S. PATENT DOCUMENTS

| | | |
|---|---|---|
| 2005/0116697 A1 | 6/2005 | Matsuo et al. |
| 2007/0096703 A1 | 5/2007 | Jain |
| 2008/0030181 A1 | 2/2008 | Liu et al. |
| 2008/0252280 A1* | 10/2008 | Prodic .................. H02M 3/157 323/283 |
| 2011/0304308 A1 | 12/2011 | Wan et al. |
| 2012/0032661 A1 | 2/2012 | Nakamura |
| 2016/0126836 A1* | 5/2016 | Schmitz ................ H02M 3/157 323/271 |
| 2016/0261183 A1* | 9/2016 | Kelly .................... H02M 3/157 |

FOREIGN PATENT DOCUMENTS

| | | |
|---|---|---|
| TW | 20080359 A | 2/2008 |
| TW | 2010 05461 A | 2/2010 |
| TW | 201005461 A | 2/2010 |
| TW | 2013 20564 A | 5/2013 |

OTHER PUBLICATIONS

Communication pursuant to Article 94(3) EPC in European Application No. 14730448.9 dated Jan. 25, 2017.
Rejection Decision Notification in Taiwan Patent Application No. 103118057 dated Mar. 16, 2017.

\* cited by examiner

PWM CALCULATION AFTER LIGHT LOAD TO HIGH LOAD TRANSITION

CROSS REFERENCE TO RELATED APPLICATIONS

This application is a national stage filing under section 371 of International Application No. PCT/EP2014/060681, filed on May 23, 2014, and published in English on Nov. 27, 2014, as WO 2014/187965 A1 and claims priority of U.S. Provisional application 61/827,230 filed on May 24, 2013, the entire disclosure of these applications being hereby incorporated herein by reference.

FIELD OF THE INVENTION

The present disclosure relates to a method for controlling a switched power converter having a light load mode and high load mode for transitioning from light load mode to high load mode.

BACKGROUND OF THE INVENTION

Switched DC DC converters comprise a switched power stage, wherein an output voltage is generated according to a switching signal and an input voltage. The switching signal is generated in a control circuit that adjusts the output voltage to a reference voltage. The switched power stage comprises a dual switch consisting of a high-side field effect transistor (FET) and a low-side FET, an inductance and a capacitor. During a charge phase, the high-side FET is turned on and the low-side FET is turned off by the switching signal to charge the capacitor. During a discharge phase the high-side FET is turned off and the low-side FET is turned on to match the average inductor current to the load current. The switching signal is generated as digital pulse width modulation signal with a duty cycle determined by a control law. The control law may be implemented by a PID compensator.

Many DC DC converters also have light mode to have better efficiency when the load runs at lower currents. In light mode instead of generating the switching signal in a digital control path the switching signal is generated by a feedback loop with a constant-on-time comparator. However, if the load current increases to normal levels there is the problem to come back to normal operation (the high load mode) without generating an unreasonable overshoot of the output voltage.

Therefore, what is needed is solution that avoids an unreasonable overshoot of the output voltage when transitioning from light load mode to high load mode.

DISCLOSURE OF THE INVENTION

The present invention relates to a switchable power converter comprising a switchable power stage comprising an inductor and a capacitor for generating an output voltage according to a switching signal and an input voltage by means of a switching element comprising a high-side switch and a low-side switch, wherein the switching signal is generated either in a digital control path or a constant on-time control path. A multi-mode controller is configured to toggle between a light load mode in which the constant on-time control path is activated and a high load mode in which the digital control path is activated. The multi-mode controller is further configured to generate a control signal for turning on the high-side switch for an additional time when transitioning from the light load mode to the high load mode.

The multimode controller may be configured to generate the switching signal for turning on the high-side switch by extending the duration of an on-time of the control signal generated in the constant on-time control path.

Specifically, the multi-mode controller may be configured to extend the duration of an on-time of the switching signal generated in the constant on-time control path when an equality of the load current and the inductor current is detected.

The present invention further relates to a method for controlling a multi-mode switchable power converter comprising a switchable power stage with a dual switching element comprising a high-side switch and a low-side switch, an inductor and a capacitor, the method comprising:
generating a switching signal for turning on the high-side switch for an additional time when transitioning between a light load mode in which a constant-on-time control path is activated and a high load mode in which a digital control path is activated.

Generating a switching signal for turning on the high side switch may comprise extending the duration of an on-time of a switching signal generated in the constant on-time control path, specifically, when an equality of the load current and the inductor current is detected.

The duration of an on-time of the switching signal generated in the constant on-time control path may be extended by half of a normal on-time period of the switching signal in high load mode.

Alternatively, the duration of an on-time of the switching signal generated in the constant on-time control path may be extended by an additional time $T_{on\text{-}additional} = V_{out}/V_{in} * TPWM * 0.5$, wherein the $V_{out}$ is the output voltage of the power stage, $V_{in}$ the input voltage and TPWM the duty cycle of a pulse width modulation signal controlling the switching element.

BRIEF DESCRIPTION OF THE DRAWINGS

Reference will be made to the accompanying drawings, wherein.

DETAILED DESCRIPTION OF THE INVENTION

Figure 1:
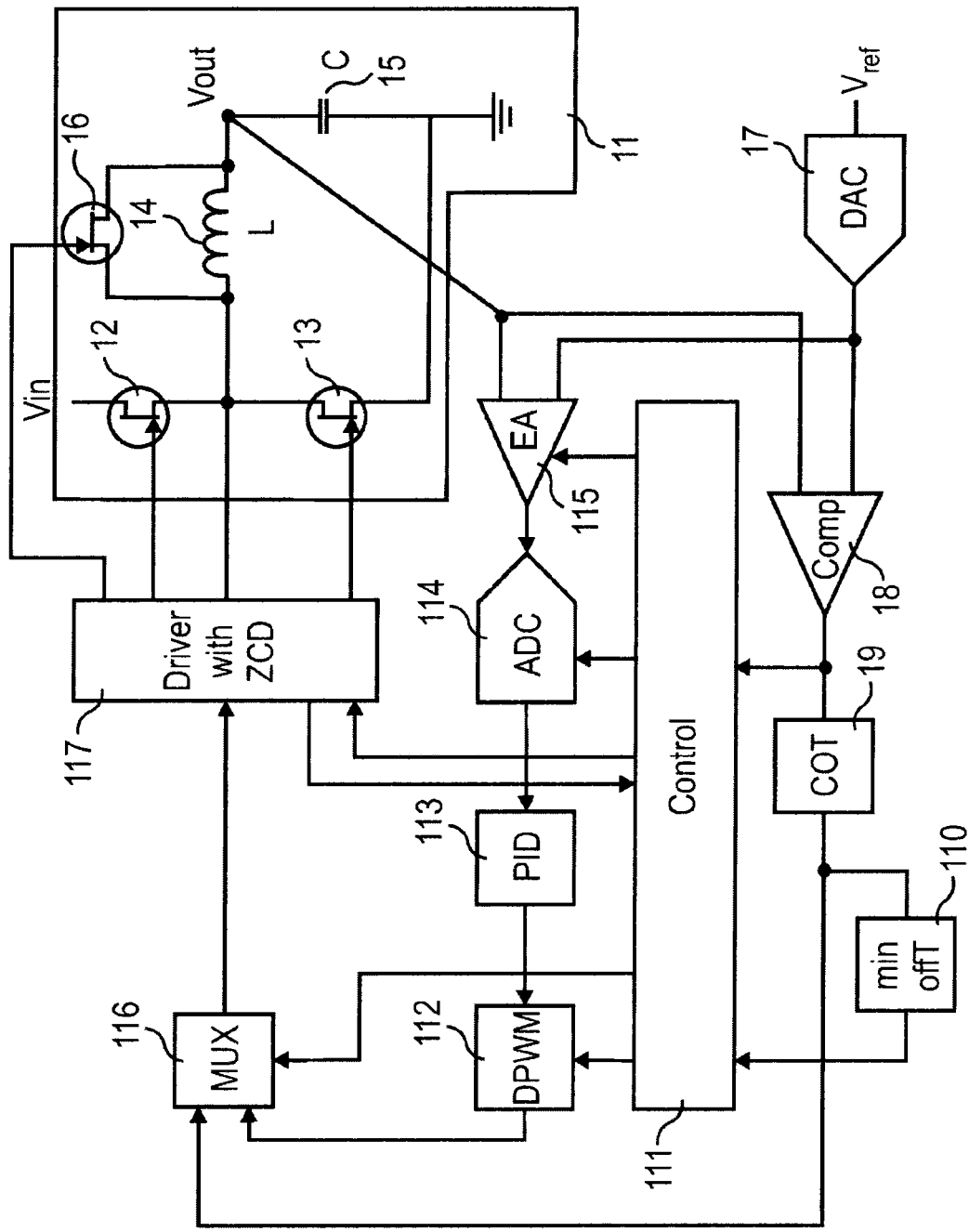
FIG. 1 shows a block diagram of DC-DC converter controlled by multi-mode compensator having a light load mode and a high load mode.

FIG. 1 shows an embodiment of a power converter being controlled by a multi-mode controller comprising a power stage 11. The power stage 11 comprises a dual switching element comprising a high-side switch 12 and a low-side switch 13, an inductor 14 and a capacitor 15. The high-side switch 12 and the low-side switch 13 are driven by a driver 117 with zero current detection. The driver 117 forwards a switching signal generated either in a digital control path or in a constant-on-time control path. The digital control path comprises an error amplifier 115, an ADC 114, a PID compensator 113 and a digital pulse width modulator 112. The constant-on-time control path comprises a comparator 18, a constant-on-time circuit 19 and a minimum off-time circuit 110. A multi-mode controller 111 is provided for toggling between a light load mode in which the constant-on-time control path is activated and a high load mode in which the digital control path is activated. The mode is determined from the load current or by monitoring the output voltage.

For this purpose the output voltage is compared to a reference voltage by the comparator 18 and the result is provided to the multi-mode controller 111.

The reference voltage may be provided digitally and is converted to the analogue domain by DAC 17.

The digital control path is activated when a high load is present and generates a digital pulse width modulation switching signal. The error amplifier 115 amplifies a difference between the output voltage and a reference voltage for generating an error signal. The error signal is converted into the digital domain by ADC 114. The PID compensator 113 processes the digitized error signal for calculating a pulse width modulation duty cycle which is provided to the digital pulse width modulator 112 that outputs the digital pulse width modulation switching signal.

The error amplifier 115, the ADC 114, the PID compensator 113 and the digital pulse width modulator 112 are adjusted with respect to bandwidth by the multi-mode controller 111.

The constant-on-time control path generates the constant-on-time switching signal in case a light load is present. The minimum off-time circuit 110 guarantees that the sum of the constant-on time and the minimum off time is greater than a normal period of the digital pulse width modulation signal generated in the digital control path. In case the multi-mode controller 111 detects that this condition is not met, the digital control path is activated.

A multiplexer 115 is provided for multiplexing the switching signal between the constant-on-time switching signal and the pulse width modulation switching signal. The multiplexer 115 is controlled by the multi-mode controller 110.

The power stage 1 comprises a third switching element 6 for short-circuiting the inductance 4 for draining an excessive current.

Figure 2:
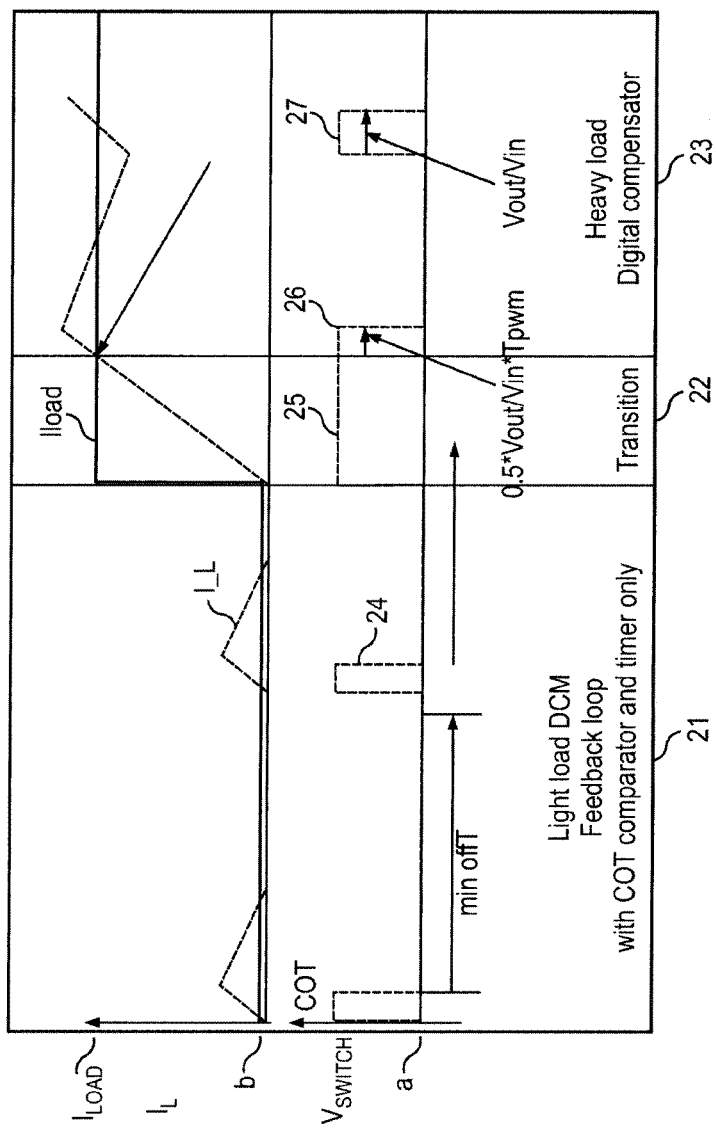
FIG. 2 shows a switching signal, a load current and an inductor current as a function of time for a transition from light load mode to high load mode.

FIG. 2 shows the switching signal (curve a) and the coil current $I_L$ (dotted line, curve b) and the load current $I_{Load}$ (solid line, curve b) of a switched DC DC power converter with a multi-mode controller for a transition from light load to high load. The switching signal controls a high-side FET in a dual FET arrangement consisting of a high side FET and a low side FET. In light load mode (section 21 on the time axis) the switching signal 24 is generated by a feedback loop with a constant-on-time comparator. Following a constant load current in the light mode (section 21, curves a and b) a jump in the load current during a transition (section 22, curves a and b) results in a rising load current, and thus in an increased duration of the on-time switching signal 25 (curve a).

At the end of the transition interval, the compensator changes to digital high load mode (section 23 on the time axis). At the end of the transition, the inductor current is equal to the load current. At this point the switching signal would go to off-time. With the present invention, however, the duration of the on-time of the switching signal is extended by half of a normal on-time period 26 of the switching signal in high load mode 27. Alternatively, the additional on-time can be computed by $T_{on-additional}=V_{out}/V_{in}*TPWM*0.5$. Hence, when an equality of the load current and the inductor current is detected the duration of the on-time is extended and limited to $V_{out}/V_{in}*TPWM*0.5$. Thus, an overshoot of the output voltage can be avoided.

Figure 3:
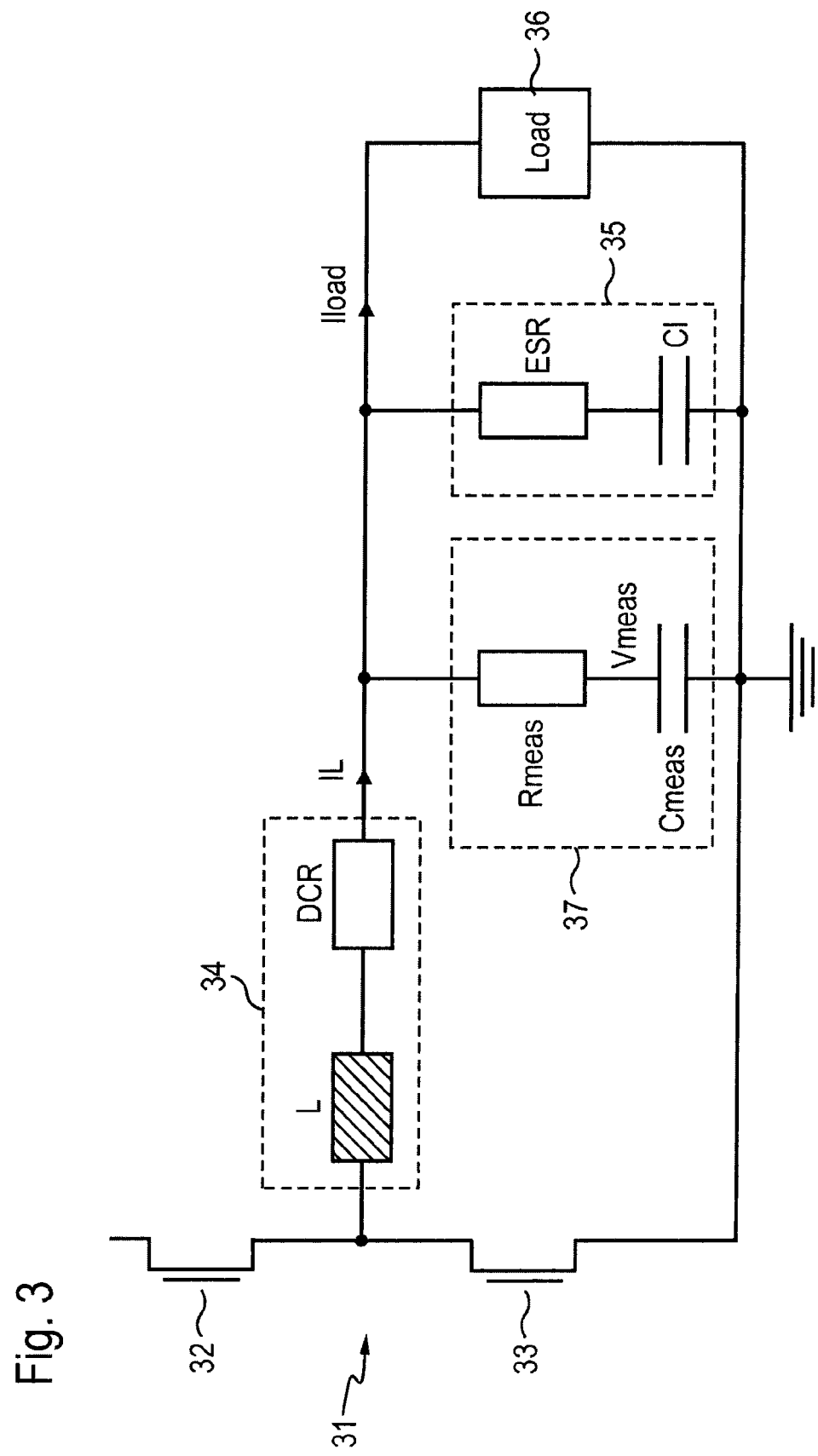
FIG. 3 shows a measurement setup for determining an equality of the inductor current and the load current.

FIG. 3 shows a measurement setup for determining the equality of the load current and the inductor current. The power stage 31 comprises a high-side switch 32, a low-side switch 33, an inductor 34, a capacitor 35 and a load 36.

Additionally the power stage 31 comprises a measurement capacitor 37. The inductor 34 is shown in terms of its ideal inductance and DCR. The capacitor 35 is shown in terms of its equivalent series resistance ESR and its ideal capacitance CI. Analogously, the measurement capacitor is shown in terms of its measurement resistance Rmeas and measurement capacitance Cmeas.

Inductor current IL and load current ILoad are equal when there is no timely change in the output voltage Vmeas. This condition is true if the measurement capacitor 37 has a time constant Rmeas*Cmeas that is equal to the time constant ESR*CI of the capacitor 35.

The invention claimed is:

1. A switchable power converter, comprising:
a switchable power stage comprising an inductor and a capacitor for generating an output voltage according to a switching signal and an input voltage by a dual switching element comprising a high-side switch and a low-side switch, wherein the switching signal is generated either in a digital control path or a constant on-time control path;
a multi-mode controller configured to toggle between a light load mode in which the constant-on-time control path is activated and a high load mode in which the digital control path is activated,
wherein the multi-mode controller is further configured to generate the switching signal for turning on the high-side switch for an additional time triggered by and added to an end of a transition interval from the light load mode to the high load mode, wherein the multi-mode controller is further configured to generate the switching signal for turning on the high-side switch by extending duration of an on-time of a control signal generated in the constant on-time control path, and wherein the multi-mode controller is configures to extend the duration of the on-time of the control signal generated in the constant on-time control path when an equality of a load current and an inductor current is determined, wherein the multi-mode controller is configured to extend the duration of the on-time of the control signal generated in the constant on-time control path by half of a normal on-time period of the control signal in high load mode, and wherein the multi-mode controller is configured to extend the duration of the on-time of the control signal generated in the constant on-time control path by the additional time Ton-additional=Vout/Vin*TPWM*0.5, wherein Vout is the output voltage of the switchable power stage, Vin is the input voltage, and TPWM is a duty cycle of a pulse width modulation signal controlling the dual switching element.

2. The switchable power converter according to claim 1, wherein the digital control path comprises an error amplifier to amplify a difference between the output voltage and a reference voltage for generating an error signal; an analog to digital converter to convert the error signal to a digitized error signal; a PID compensator to process the digitized error signal for calculating a pulse width modulation duty cycle provided to a digital pulse width modulator to generate a digital pulse width modulation switching signal.

3. The switchable power converter according to claim 2, wherein the constant-on-time control path comprises a comparator configured to compare the output voltage generated in the switchable power stage and the reference voltage; a constant-on-time circuit connected to the comparator and a minimum-off-time circuit connected between a constant-on-time circuit and the multimode controller to guarantee that a sum of the constant on-time and a minimum off-time is greater than a normal period of the digital pulse width modulation signal.

4. The switchable power converter according to claim 3, wherein the multimode controller is configured to activate the digital control path when the sum of the constant on-time and the minimum off-time is not greater than the normal period of the digital pulse width modulation signal.

5. The switchable power converter according to claim 1, further comprising a driver with zero current detection to drive the dual switching element according to the switching signal; and a multiplexer controlled by the multimode controller to forward the control signal either generated in the constant on-time control path or the digital control path to the driver.

6. The switchable power converter according to claim 1, wherein the switchable power stage further comprises a third switching element to short-circuit the inductor for draining an excessive inductor current.

7. A method for controlling a multi-mode switchable power converter comprising a switchable power stage with a dual switching element comprising a high-side switch and a low-side switch, an inductor and a capacitor, the method comprising:

generating a switching-a signal for turning on the high-side switch for an additional time triggered by and added to an end of a transition interval between a light load mode in which a constant on-time control path is activated and a high load mode in which a digital control path is activated, wherein generating the switching signal for turning on the high side switch comprises extending duration of an on-time of a switching signal generated in the constant on-time control path; and extending the duration of the on-time of the switching signal generated in the constant on-time control path when an equality of a load current and an inductor current is determined, wherein generating the switching signal for turning on the high side switch comprises extending duration of the on-time of the switching signal generated in the constant on-time control path by half of a normal on-time period of a control signal in high load mode, and wherein generating the switching signal for turning on the high side switch comprises extending the duration of the on-time of the switching signal generated in the constant on-time control path by the additional time Ton-additional=Vout/Vin*TPWM*0.5, wherein Vout is an output voltage of the switchable power stage, Vin an input voltage and TPWM is a duty cycle of a pulse width modulation signal controlling the dual switching element.

* * * * *